July 9, 1957 T. BOTTLANDER 2,798,726
FERTILIZER SPREADER
Filed May 7, 1953 4 Sheets-Sheet 1

Inventor
T. Bottlander
By Glascock Downing Seebold
Attorneys

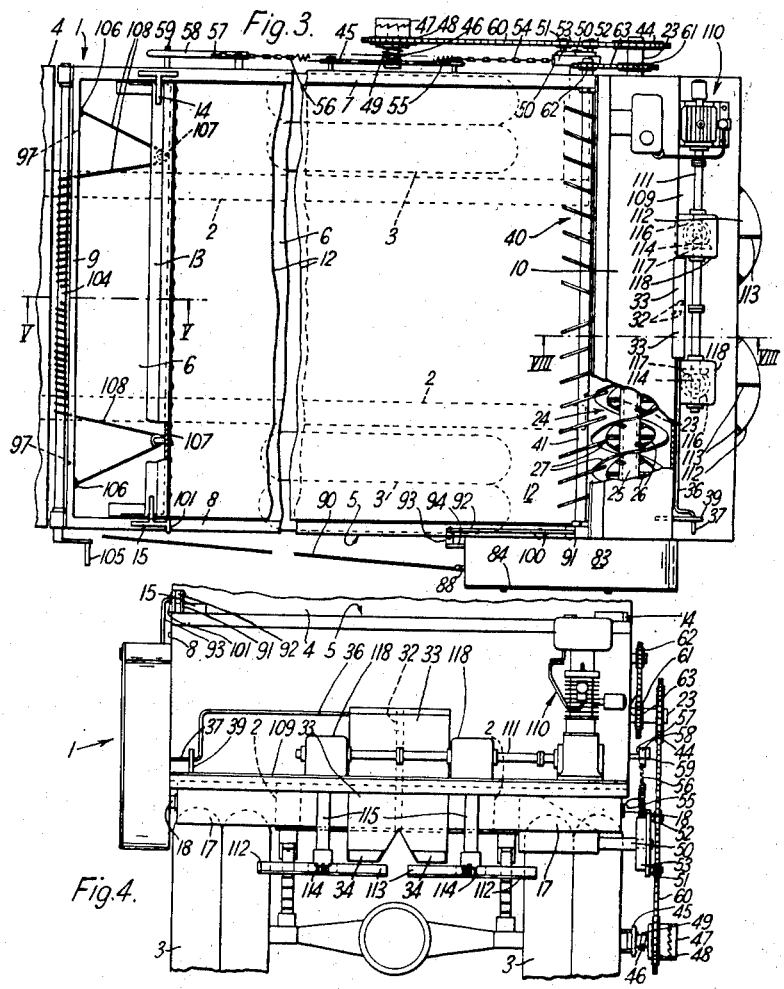

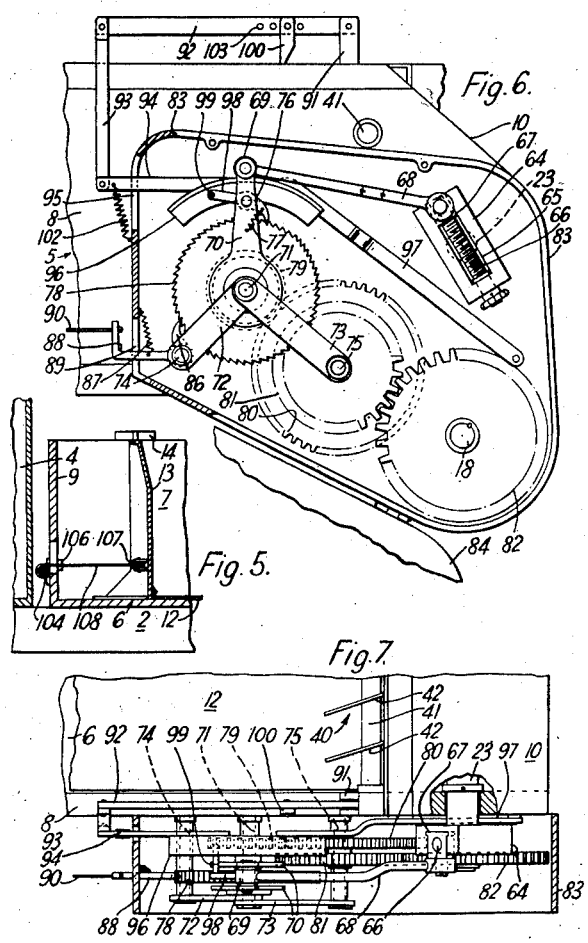

July 9, 1957
T. BOTTLANDER
2,798,726
FERTILIZER SPREADER
Filed May 7, 1953
4 Sheets-Sheet 4
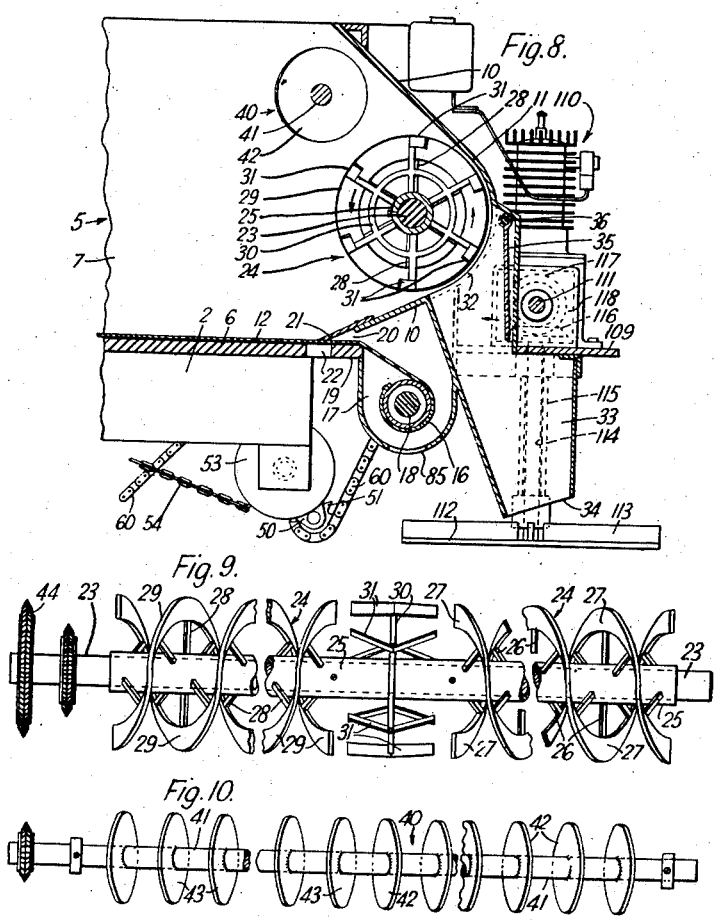
Inventor
T. Bottlander
By
Attorneys

United States Patent Office 2,798,726
Patented July 9, 1957

2,798,726

FERTILIZER SPREADER

Theodor Bottlander, Belmont, Lower Hutt, New Zealand, assignor to Frederick Evans Musgrove, Blenheim, New Zealand Application May 7, 1953, Serial No. 353,614

Claims priority, application New Zealand April 22, 1953

3 Claims. (Cl. 275—5)

The invention relates to vehicles designed for use in distributing loose or comminuted material, such as lime or artificial fertilizers or other kinds of earth dressings, over the ground, the invention being concerned with vehicles which, for the purpose stated, are of the type comprising a container for the material to be distributed, and a flexible false bottom or mat arranged over the floor of the container and connected to operating mechanism, the arrangement being such that, as the vehicle travels over the ground, the flexible false bottom or mat will be moved along the floor so as to cause the material to be progressively discharged from the rear end of the vehicle.

One of the objects of the invention is to improve upon the construction of the distributing mechanism of vehicles of the type indicated, so as to make the mechanism generally more efficient and reliable in operation.

Another object of the invention is to improve upon the construction of the distributing mechanism of vehicles of the type indicated, in such a way that the rate of discharge of the material at the rear of the vehicle can be regulated over a relatively wide range irrespective of the speed at which the vehicle travels over the ground.

A further object of the invention is to improve upon the construction of the distributing mechanism of vehicles of the type indicated, in such a way that this mechanism will act effectively even where the material to be distributed is in a damp or wet condition tending to cause its particles or pieces to stick together or agglomerate.

A vehicle of the type and for the purpose specified, when constructed in accordance with the present invention, comprises a container for the loose material to be distributed, the container having at least one rearwardly disposed outlet opening through which the material can be discharged at the rear of the vehicle; a flexible false bottom or mat (hereinafter referred to as a flexible mat) arranged upon the floor of the container, one end of the flexible mat being connected to a winding roller situated adjacent the rear end of the container, while the other end of the mat is connected to a pusher-board mounted for movement within and along the container; a rotatable worm arranged transversely within the container adjacent the outlet opening in the latter and adapted to co-operate with the mat and pusher-board so as to direct the material to be distributed into the said opening; means for rotating the worm from a road wheel of the vehicle when the latter travels forwardly over the ground; a driving connection arranged between the worm and winding roller and adapted, during forward travel of the vehicle, to rotate the roller in a direction for winding the mat thereon with consequent movement of the mat and pusher-board towards the worm, said driving connection including a reciprocatable pawl co-acting with a ratchet wheel; means for varying the amplitude of reciprocatory movement of the pawl; means for rendering the pawl inoperative when the pusher-board reaches a position near the worm; and means enabling the pusherboard to be returned to its initial forward position with consequent rotation of the winding roller in a direction permitting the mat to pay itself out over the floor of the container.

Preferably the vehicle includes at least one horizontally disposed spinner disc adapted to receive the material as the latter passes out of the outlet opening in the container, means being provided for rotating said disc so that the material is caused to be spread over the ground by the centrifugal force imposed on it by the disc.

The accompanying drawings show the invention embodied in a mechanical propelled road vehicle. In the drawings:

Figure 3 is a plan view corresponding to Figure 1;

Figure 4 is a rear end view of the vehicle with parts broken away;

Figure 5 is a sectional view on the line V—V of Figure 3;

Figure 6 is a side elevational view to an enlarged scale and partly in section, of part of the mechanism shown in Figure 1;

Figure 7 is a plan view, partly in section, corresponding to Figure 6;

Figure 8 is a sectional view on the line VIII—VIII of Figure 3, and to the same scale as that of Figures 6 and 7;

Figure 9 is an elevational view of the worm, to the same scale as in Figure 8, and Figure 10 is an elevational view, to the same enlarged scale, of an agitator forming part of the mechanism with part broken away.

Figures 1, 2:
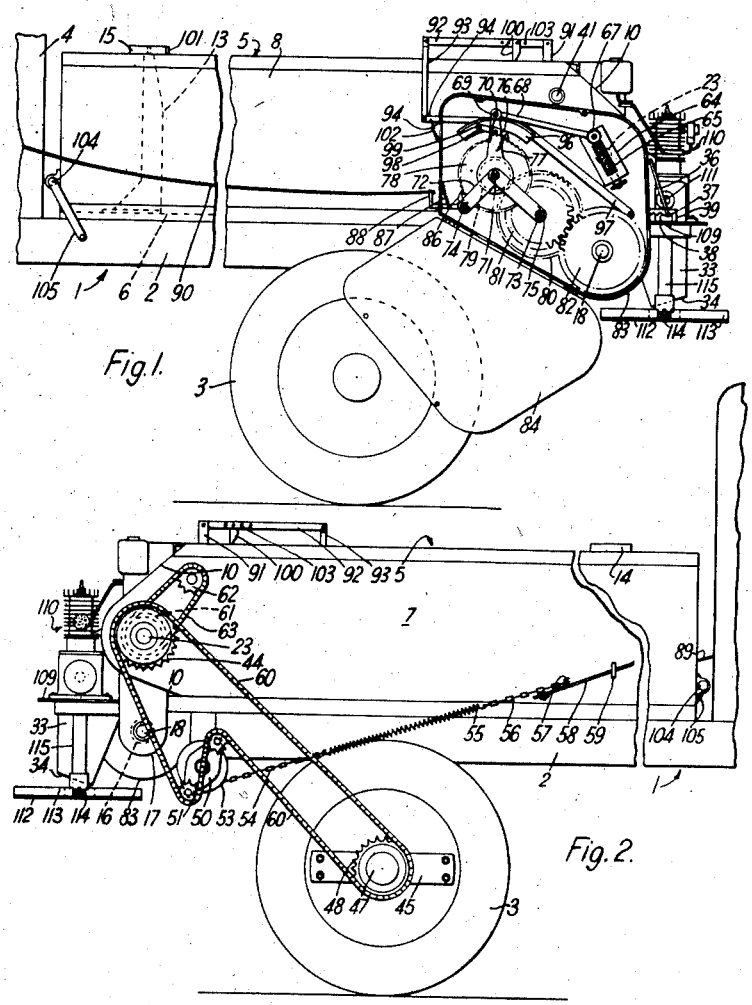
Figure 1 is an elevational view from one side of the vehicle with parts broken away.
Figure 2 is an elevational view from the opposite side of the vehicle with parts broken away.

In the drawings the mechanically propelled vehicle is generally indicated at 1 in Figures 1 to 4, the vehicle having a chassis 2 with the usual steerable front road wheels (not shown) and power-driven rear road wheels 3.

The chassis 2 supports a driving cab 4 and, behind the latter, a container generally indicated at 5, the container having a floor 6, two side walls 7 and 8, a fore-end wall 9 and a rear end wall 10. The rear end wall 10 curves outwardly and then inwardly to form, within the rear end of the container, a transversely disposed and part-cylindrical cavity 11 (Figure 8) for a purpose to be described.

The floor 6 of the container 5 is overlaid by a flexible mat 12 (Figures 3, 5 and 8) of rubberized canvas or like material. The forward end of the mat 12 is joined to the lower edge of a transversely disposed pusher-board 13 arranged within and movable along the container 5, this board being supported by runner plates 14 and 15 resting slidably on the upper edges of the side walls 7 and 8 of the container. The rearward end of the mat 12 is secured to a transversely disposed winding roller 16 (Figures 2 and 8) accommodated in a compartment 17 arranged directly beneath the curved rear end wall 10 of the container 5, the winding roller being secured to a shaft 18 journalled for rotation in bearings in the end walls of the compartment 17. The shaft 18 is so located that the winding roller 16 lies rearwardly of the rear edge 19 (Figure 8) of the floor 6 of the container 5 and the upper edge of the roller lies below the level of the floor.

The lower edge of the rear end wall 10 of the container 5 terminates a short distance above the rear edge 19 of the floor 6 so as to leave a gap 20 (Figure 8) through which the mat 12 can freely move from the floor onto the winding roller 16, and vice versa. To prevent the material placed in the container for distribution, from passing through the gap 20 into the compartment 17, the lower edge of the rear wall 10 is fitted with a flexible scraper blade 21 of rubberized canvas or like material, the free edge of which bears resiliently on the upper surface of the mat 12. Preferably, to prevent excessive wear between the free edge of the scraper blade 21 and the upper surface of the mat 12, a transversely disposed slot 22 (Figure 8) is provided in the floor 6 directly beneath the said end of the scraper blade so as to allow the mat to "give" under pressure from the blade as the mat passes over this slot.

Along the axis of the cavity 11 in the rear end of the container 5 there is provided a shaft 23 journalled for rotation in the side walls 7 and 8 of the container, this shaft forming a mounting for a worm which is generally indicated at 24 in Figures 3, 8 and 9, and details of which are illustrated in Figures 8 and 9. Referring more particularly to Figure 9, there is secured around the shaft 23 a tubular hub 25 one end portion of which carries a series of spokes 26 to the outer ends of which there are secured two helically shaped blades 27 the convolutions of which surround the hub 25 and progress towards a point along the shaft situated midway between the side walls 7 and 8 of the container. The other end portion of the hub 25 carries a series of spokes 28 to the outer ends of which there are secured two helically shaped blades 29 of the same shape, pitch and length as the blades 27 but progressing in the opposite direction. The two sets of blades 27 and 29, considered in cross-section, have a diameter such that part of their outer edges lie close to the curved inner surface of the cavity 11.

The two sets of blades 27 and 29 of the worm 24 terminate at a distance from each other so as to leave free a portion of the shaft 23 and hub 25 lying midway between the side walls 7 and 8 of the container 5. To this free portion of the hub there is secured a spider 30 to the outer edge of which there is secured a series of V-shaped beater blades 31 whose outer edges lie in a circle of the same diameter as that defined by the outer edges of the blades 27 and 29 when considered in cross-section.

In association with the worm 24 there is formed in the lower part of the rear end wall 10 of the container 5, two openings 32 (Figures 3, 4 and 8) arranged symmetrically with respect to the beater blades 31 and lying opposite the inner end portions of the two sets of worm blades 27 and 29. Each of these openings 32 provides a channel of communication between the interior of the container 5 and a downwardly extending chute 33 the lower end 34 of which is open to provide an outlet above the ground over which the vehicle 1 travels. Each chute 33 contains a flap-valve 35 (Figure 8) secured for pivotal movement to a rod 36 which is journalled for rotation in the end walls of the chutes, it thus being possible to vary, at will, the position of the two valves in unison so as to regulate the effective size of the outlet ends 34 of the two chutes. For operating the flap-valves 35, one end portion of the rod 36 is prolonged beyond the outer end wall of one of the chutes and this exposed portion of the rod is bent to form a crank 37 engaging in a selected one of a series of recesses 38 (Figure 1) in a fixed locking plate 39. The exposed portion of the rod 36 is sufficiently long to enable it to be flexed by hand so that the crank 37 can be disengaged from one of the recesses 38 in the plate 39 and engaged with another of the recesses, thereby holding the flap-valves 35 in a desired position of adjustment.

Within the container 5 there is provided an agitator generally indicated at 40 in Figures 3, 8 and 10, and comprising a transversely disposed shaft 41 journalled for rotation in bearings in the side walls 7 and 8 and arranged forwardly of and above the worm 24 so that it lies near the upper edge of the rear wall 10 of the container, the shaft 41 being fitted along one of its two end portions with a series of agitator discs 42 inclined in one direction, and along its other end portion with a series of agitator discs 43 inclined in the opposite direction to the discs 41. The purpose served by the agitator 40 will be explained later.

The worm 24 is adapted to be rotated from one of the rear road wheels 3 of the vehicle 1. For this purpose, the worm shaft 23 is prolonged beyond the outer face of the side wall 7 of the container 5 and a sprocket wheel 44 (Figures 2, 3, 4 and 9) is keyed to this exposed portion of the shaft. To the body of the rear road wheel 3 at the corresponding side of the vehicle 1 there is secured a diametrically arranged plate 45 (Figures 2, 3 and 4) to which is secured a pin 46 in alignment with the axis about which the wheel rotates. The outer end of this pin is formed with a head 47 having ratchet teeth on its inner vertical surface. Between the plate 45 and the head 47, the pin 46 rotatably supports a sprocket wheel 48 having a hub formed with ratchet teeth which are normally held in engagement with the ratchet teeth on the head 47 by means of a compression spring 49 exerting pressure between the plate 45 and the sprocket wheel 48. The ratchet teeth on the head 47 and on the hub of the sprocket wheel 48 are so directed that when the vehicle 1 is driven forwardly, the sprocket wheel will be rotated from and in the same direction as the adjacent road wheel 3, while when the vehicle is driven rearwardly, the sprocket wheel 48 will be able to "free wheel." In other words, the arrangement provides for a one-way clutch drive to the sprocket wheel. To a part of the chassis 2 of the vehicle lying between the two sprocket wheels 44 and 48 there is pivotally secured a lever 50 having oppositely directed arms upon the ends of which are rotatably mounted sprocket wheels 51 and 52 acting as jockey wheels. The lever 50 is formed about its center with a drum-like part 53 to the lower part of the periphery of which there is connected one end of a length of chain 54 the other end of which is connected to one end of a forwardly directed tension spring 55 (Figures 2, 3 and 4). The other end of this spring is connected to one end of a further length of chain 56, the other end of which is engaged with a hook 57 carried by a forwardly directed hand lever 58 and arranged intermediate the ends of the latter. This hand-lever is pivotally connected by its rear end to the side wall 7 of the container 5, and is normally held in its forward position by engagement with a catch 59 secured to the side wall 7. In this position of the hand-lever 58, the spring 55 is maintained under tension and tends to rotate the lever 50 in a counterclockwise direction as viewed in Figure 2. An endless driving chain 60 is engaged with the sprocket wheel 48, then passes upwardly and rearwardly over the sprocket wheel 44, then downwardly and under the jockey wheel 51, then upwardly and over the jockey wheel 52, and finally downwardly and forwardly to the sprocket wheel 48.

With the arrangement just described, the driving chain 60 serves to impart rotary motion to the worm 24 from one of the rear road wheels 3 of the vehicle 1 when the latter is driven forwardly over the ground. As the vehicle moves in this direction the driving chain 60 is driven in a direction causing the worm 24 to rotate in a counterclockwise direction as viewed in Figure 8, the blades 27 and 29 of the worm being so set that material engaged by them is caused to move away from both side walls 7 and 8 of the container 5 towards the center of the rear wall 10 of the container and thus to be fed to the openings 32 in the rear end wall 10. The spring 55 acting in conjunction with the lever 50, ensures that the driving chain 60 will always remain at requisite tension, while allowing the corresponding road wheel 3 to rise and fall relatively to the container 5 when the vehicle 1 is driven over bumpy or uneven ground, thereby relieving the driving chain of snatching strains at all times. By releasing the hand-lever 58 from the catch 59 and swinging it rearwardly the spring 55 will be rendered inoperative so that slackness will then develop in the driving chain 60, permitting the latter easily to be repaired or replaced.

The agitator 40 is driven from the worm shaft 23. To this end, a second sprocket wheel 61 (Figures 2, 3 and 4) is keyed to the projecting portion of the worm shaft, while the agitator shaft 41 is prolonged beyond the outer face of the side wall 7 of the container 5, and a sprocket wheel 62 is keyed to the exposed portion of this shaft, an endless chain 63 being engaged with these two sprocket wheels. Thus the agitator 40 is rotated in the same direction as and concomitantly with the worm 24.

When the vehicle 1 is about to be driven in reverse, the hand-lever 58 may be swung to a rearward position so as to slacken the driving chain 60 sufficiently to make certain that the one-way clutch connection, 46 to 49 between the chain and the corresponding ground wheel 3 will act with its full free-wheel effect, thus ensuring that not only the worm 24 but also the agitator 40 will not rotate while the vehicle is moving backwards.

When the worm 24 is rotated as the result of forward movement of the vehicle, such rotation also acts to impart a step-by-step rotary movement to the winding roller 16 in a direction causing the mat 12 and, with it, the pusher-board 13 to move towards the rear end of the container 5. To this end, the end portion of the worm shaft 23 which is journalled in the side wall 8 of the container, is prolonged beyond the outer face of this wall and to the exposed portion of the shaft there is keyed a double-throw crank 64 (Figures 1, 6 and 7), that is to say, a crank having two oppositely disposed arms lying diametrically across the axis of the worm shaft 23. In the length of the crank 64 there is formed a slot 65 containing a rotatable hand-operated screw 66 which engages in a block 67 slidable along and projecting laterally from the slot 65. To the block 67 there is rotatably connected one end of a rod 68 the other end of which is connected to a bush 69 rotatably mounted between the upper ends of a member constituted by a pair of downwardly extending arms 70. The lower ends of these arms are rotatably mounted on a pin 71 supported between the side wall 8 of the container 5 and the upper ends of downwardly diverging brackets 72 and 73 the lower ends of which are, in turn, supported from the wall 8 by means of pins 74 and 75. Just below the bush 69, the arms 70 support a pivoted pawl 76 the nose of which extends rearwardly and normally engages, under the influence of a spring 77 (Figures 1 and 6), with the teeth of a ratchet wheel 78 arranged between the arms 70 and mounted for rotation on the pin 71.

To the inside face of the ratchet wheel 78 there is secured a pinion wheel 79 of relatively small diameter, this wheel being in mesh with a pinion wheel 80 which is of relatively large diameter and is mounted for rotation on the pin 75. To the outside face of the pinion wheel 80 there is secured a toothed wheel 81 of relatively small diameter, this wheel meshing with a toothed wheel 82 of larger diameter which is keyed to an end portion of the shaft 18 of the winding roller 16, projecting from one end of the compartment 17.

The mechanism constituted by the parts 64 to 82 is accommodated in a protective housing 83 secured to the outside face of the side wall 8 of the container 5 and fitted with a hinged lid 84 (shown to be in open position in Figures 1 and 6), enabling access to these parts to be gained for lubrication or overhaul.

The arrangement so far described operates as follows:

Assuming that the vehicle 1 is stationary and that the pusher-board 13 lies close to the fore-end wall 9 of the container 5, the loose material to be distributed is loaded into the space in the container lying between the pusher-board 13, the rear end wall 10 and the side walls 7 and 8. When the said space has been filled, the vehicle 1 is driven forwardly over the ground. The worm 24 and agitator 40 are thus caused to be rotated in a counter-clockwise direction as viewed in Figure 8.

Rotation of the shaft 23 of the worm 24 causes rotation of the crank 64 which, in turn, causes the connecting rod 68 to move first forwardly and then rearwardly and so on, thereby imparting a reciprocatory movement to the arms 70 about the axis of the pin 71. As the pawl 76 is carried by these arms, it is caused also to reciprocate first forwardly and then rearwardly. During its rearward stroke, the nose of the pawl is in driving engagement with the teeth of the ratchet wheel 78 so that the pawl acts to rotate this wheel by one step in a clockwise direction as viewed in Figure 6. This movement of the ratchet wheel 78 is transmitted to the shaft 18 of the winding roller 16 through the train of wheels 79, 80, 81 and 82 and it will be seen, by considering the train, that the winding roller 16 is rotated by one step in a clockwise direction as viewed in Figures 6 and 8, that is to say, in a direction causing the flexible mat 12 to be wound thereon.

When the pawl 76 partakes of a forward stroke, its nose merely rides over the teeth of the ratchet wheel 78 so that motion in a direction opposite that first described is not imparted to the ratchet wheel.

By rotating the hand-screw 66 in either direction, the block 67 will be brought nearer to or further away from the center about which the crank 64 rotates, thereby shortening or lengthening the extent of "throw" of the connecting rod 68. Hence, the amplitude of reciprocation of the pawl 76 will be correspondingly varied and such variation will be reflected in the extent of movement of the ratchet wheel 78 during each increment of rotation thereof. Thus, in comparison with the speed of forward movement of the vehicle 1, the speed of movement transmitted to the mat 12 and pusher-board 13 can be varied to suit requirements.

In short, the mechanism so far described provides a variable one-way drive ensuring that the winding roll 16 will be rotated at a desired speed in a direction for winding up the mat 12 when the vehicle 1 is driven forwardly. As the winding roller 16 thus rotates, the mat and, with it, the pusher-board 13 will be drawn step-wise and gradually towards the rear end wall 10 of the container 5 so that the loose material within the container will be pressed into engagement with the worm 24. The worm rotates constantly during this time and its blades 27 and 29 are so directed that the loose material coming into contact with them is propelled towards the longitudinal center-line of the container 5 so that it passes from the cavity 11 into the openings 32, thence falling down the chutes 33 at the outside of the container.

As the worm blades 27 and 29 act to propel portions of the loose material towards one another from opposite lateral points, the material, especially if it is wet or damp, may tend to become packed in the vicinity of the openings 32 and thus become too dense to fall freely into the chutes 33. The beater blades 31 guard against the development of such a fault as they act to break up the material tending to accumulate midway in the length of the worm 24, so that the material is kept in a sufficiently flowable state to pass with ease through the openings 32.

Again, especially where the loose material is wet or damp, it may tend to accumulate as a mass above the worm 24. This fault is inhibited by the presence, in this locality, of the agitator 40 which also rotates constantly while the vehicle 1 is being driven forwardly, and the discs 42 and 43 of which, being inclined, act to break up the material should it be prone to collect in the said locality.

The bottom of the compartment 17 containing the winding roller 16 may be formed with an opening 85 (Figure 8) allowing escape from the compartment of any dust or fine particles that may be carried by the mat 12 past the scraper blade 21.

Upon the pin 74 there is pivotally mounted a check-pawl 86 (Figures 1 and 6) the nose of which is normally held in engagement with the teeth of the ratchet wheel 78 by means of a tension spring 87 one end which is connected to a tail portion 88 on the pawl, while the other end is anchored to the housing 83. The tail portion 88 of the check-pawl 86 extends through a clearance slot 89

(Figure 6) in the housing 83 and there is connected to the said portion a cord 90 which passes to the driving cab 4 of the vehicle for operation by the driver when desired.

The check-pawl 86 and cord 90 have two functions. In the first place, the pressure of the pusher-board 13 on the material in the container, when the material is being fed to the worm 24, tends to cause the mat to move by reaction, towards the fore-end of the container 5, thereby imparting to the winding roller 16 a rotary movement in the unwinding direction, such movement being transmitted, through the train of wheels 82, 81, 80 and 79, to the ratchet wheel 78 which thus tends to rotate in the wrong direction, that is to say, in a direction causing its teeth to follow the pawl 76 while the latter is performing its forward or idling stroke. The check-pawl 86 acts to prevent such wrong rotation of the ratchet wheel so that the latter is held stationary while the pawl 76 is idling preparatory to execution of its driving stroke. In the second place, should the driver of the vehicle feel, by the load on the driving unit of the vehicle, that the worm 24 is not ensuring sufficient speed of delivery of the loose material to the openings 32 as the material is fed to the worm by the moving mat 12 and pusher-board 13, then, by pulling the cord 90 he can render the check-pawl 86 inoperative. The mat 12, being of flexible material, has a certain amount of inherent elasticity so that it can "give" between the pusher-board 13 and the winding roller 16. Hence, when the check-pawl 86 is put out of action, the pawl 76, during its rearward stroke, will rotate the ratchet wheel 78 in the usual way in one direction to move the mat 12 and pusher-board 13 by one step in the feeding direction, while when the pawl 76 makes its forward or idling stroke, the ratchet wheel 78 will correspondingly rotate by one step in the opposite direction under the pull exerted by the mat so that the latter will merely stretch and then contract. Hence, the pusher-board 13 will no longer progress towards the worm 24, and as the worm continues to rotate while the vehicle is being driven forwardly, it will have an opportunity to clear the obstruction, whereupon the driver can release the cord 90, thereby allowing the check-pawl 86 to return to its operative position.

The vehicle includes means acting in such manner that when the pusher-board 13 has been brought by the mat 12 to a position in which it lies close to the agitator 40, that is to say, when the container 5 has become practically empty of the loose material, further movement of the mat and pusher-board in the feeding direction ceases automatically even if the vehicle continues to be driven forwardly.

For the purpose just stated, there is secured to the upper edge of the side wall 8 of the container 5, in a position situated adjacent the shaft 41 of the agitator 40, a bracket 91 (Figures 1, 2, 3, 4, 6 and 7) to which is pivotally connected one end of a forwardly directed arm 92. To the forward end of this arm there is pivotally connected a depending rod 93 the lower end of which is pivotally connected to an arm 94 extending through a clearance slot 95 (Figures 6 and 7) in the housing 83 and joined to a shoe 96 arranged within the housing and lying adjacent the pawl 76. The shoe is carried by a lever 97 pivotally supported on the side wall 8 of the container 5 so that, when the arm 92 swings downwardly, the shoe will be lowered, while when the arm is swung upwardly, the shoe will be raised. The pawl 76 is formed with a tail portion 98 carrying a pin 99 so disposed that it will be engaged by the shoe 96 when the latter is lowered due to downward swinging movement of the arm 92, such engagement causing the nose of the pawl 76 to be brought out of engagement with the teeth of the ratchet wheel 78 so that the pawl is then rendered inoperative during its reciprocatory movement. In its elevated position, the shoe 96 is out of engagement with the pin 99 on the tail portion 98 of the pawl 76 so that the pawl is free to impart a step-by-step rotary motion to the ratchet wheel 78 as already described, the shoe being normally held in this elevated position by means of a depending finger-piece 100 pivotally connected by its upper end to the arm 92 intermediate the ends of the latter, the lower end of the finger-piece resting on the upper edge of the side wall 8 of the container 5. The rearward end of the runner plate 15 on the pusher-board 13 is formed with a transverse portion 101 (Figures 1, 3 and 4) which, when the pusher-board has arrived at a position in which it lies adjacent the agitator 40, engages with the finger-piece 100 and swings the latter rearwardly and upwardly. As a result, the arm 92 is free to swing downwardly with consequent descent of the shoe 96, thereby rendering the pawl 76 inoperative so that rotary movement is no longer imparted to the ratchet wheel 78. To ensure descent of the arm 92, rod 93 and shoe 96 when the finger-piece 100 has been moved to inoperative position, there is provided a tension spring 102 having one end anchored to the arm 94 on the shoe and the other end anchored to the housing 83. The pivotal connection between the finger-piece 100 and the arm 92 is somewhat stiff so that, while the finger-piece is free to be swung upwardly when engaged by the transverse portion 101 of the runner plate 15, it will normally remain in its vertical position in spite of vibrations set up when the vehicle is being driven over the ground during the distributing operation.

The arm 92 may be formed with a series of holes 103 and the pivot for the finger-piece 100 may be constituted by a removable pin engageable in any selected one of the holes 103 so as to vary the position of the finger-piece along the arm 92. Such an arrangement permits the finger-piece to be tripped earlier or later by the portion 101 of the runner plate 15 according to requirements.

When the container 5 has become practically empty and the pusher-board 13 has consequently arrived at a position at which it has come to rest near the agitator 40, with the mat 12 fully wound on to the winding roller 16, it is necessary to return the pusher-board and mat to their initial positions to enable the container to be reloaded. The vehicle includes means, now to be described, facilitating restoration of the pusher-board and mat to their starting positions.

A transversely disposed shaft 104 (Figures 1, 2, 3 and 5) is journalled for rotation in bearings projecting from the lower part of the fore-end wall 9 of the container 5, one end of this shaft being fitted with a crank 105 enabling the shaft to be rotated by hand from outside the container. Two spaced lugs 106 (Figures 3 and 5) are secured to the inside of the fore-end wall 9 of the container 5, while two spaced pulley wheels 107 are mounted on the forward face of the pusher-board 13. To each of the lugs 106 there is anchored one end of a cable 108 which extends through an opening 97 (Figure 3) in the fore-end wall 9 and rearwardly above the floor 6 of the container, is engaged round the corresponding pulley wheel 107 and then returns forwardly, the other end of the cable being wound on the shaft 104 which acts as a winding roller for the two cables.

As the pusher-board 13 is moved rearwardly under the pull exerted on it by the mat 12, the cables 108 are paid out from the shaft 104 which concomitantly rotates freely in one direction. When the pusher-board 13 has arrived at the end of its rearward travel and the pawl 76 has consequently been tripped into its inoperative position, the shaft 104 can be rotated in the opposite direction by means of the hand-crank 105, thereby causing the cables 108 to be wound on this shaft so that they act to pull the pusher-board 13 and, with it, the mat 12, into its foremost position ready for the reloading of the container 5.

The vehicle includes means for spreading the loose material over a relatively wide area as the material falls from the lower ends 34 of the chutes 33. For this purpose, a shelf 109 (Figures 1, 2, 3, 4 and 8) projects rearwardly from the compartment 17 containing the winding roller 16, and on one end of this shelf there is mounted an independent power-unit generally indicated at 110 and shown to be in the form of an internal combustion engine whose output shaft 111 extends along the shelf. Beneath the lower end 34 of each chute 33 there is provided a horizontally disposed spinner disc 112 the upper surface of which is provided with radially disposed blades 113. Each spinner disc is secured to the lower end of a vertically disposed spindle 114 journalled for rotation in a sleeve 115 depending from the shelf 109, the spindle passing freely through the shelf and being fitted at its upper end with a bevel wheel 116 (Figures 3 and 8) in mesh with a bevel wheel 117 on the output shaft 111 of the power unit 110. The two bevel wheels 116 and 117 associated with each spindle 114 are housed in a gear box 118 supported on the upper surface of the shelf 109, the two sets of bevel wheels being so arranged that when the power unit 110 is running, the two spinner discs 112 will be rotated in opposite directions.

When the power unit 110 is operating to cause rotation of the spinner discs 112, and the loose material from the hoppers 33 falls from the lower open ends 34 thereof on to the upper surfaces of the discs, the blades 113 will cause the material to travel round with the discs until the material acquires sufficient centrifugal force to compel it to fly out from the discs in horizontal directions so that it is distributed over a relatively wide area of the ground. The spinner discs are driven quite independently of other moving parts of the vehicle so that they can be caused to rotate at any desired speed irrespective of the speed at which the vehicle is driven over the ground.

The parts of the chutes 33 lying above the shelf 109 may be fitted with hinged doors (not shown) for inspection and cleaning.

What I do claim and desire to obtain by Letters Patent of the United States of America is:

1. A vehicle for use in distributing loose or comminuted material over the ground, the vehicle comprising a container for the material, the container having a floor, two side walls, a fore-end wall and a rear-end wall and also having at least one rearwardly disposed outlet opening through which the material can be discharged at the rear of the vehicle; a flexible mat arranged upon the floor of the container, one end of the flexible mat being connected to a winding roller situated adjacent the rear end wall of the container, while the other end of the mat is connected to a pusher-board arranged within the container; runners resting slidably on the upper edges of the side walls of the container and acting to support the pusher-board for movement along the container; a rotatable worm arranged transversely within the container adjacent the outlet opening in the latter and adapted to cooperate with the mat and pusher-board so as to direct the material to be distributed into the said opening, the worm comprising a rotatable shaft carrying two sets of helically shaped blades progressing towards one another; means for rotating the worm from a road wheel of the vehicle when the latter travels forwardly over the ground; driving mechanism arranged between the worm shaft and the winding roller and adapted, during forward travel of the vehicle, to rotate the roller step-by-step in a direction for winding the mat thereon with consequent step-by-step movement of the pusher-board towards the worm, said mechanism comprising a crank secured to the worm shaft, a rotatable ratchet wheel, an arm mounted for a rocking movement about the axis of the ratchet wheel, a pawl carried by the arm and engaging with the ratchet wheel, and a rod one end of which is rotatably connected to the crank while the other end is rotatably connected to the arm so that the crank will act to rock the arm with consequent reciprocation of the pawl; means for varying the amplitude of reciprocatory movement of the pawl; means actuated by one of the said runners for rendering the pawl inoperative when the pusher-board reaches a position near the worm; and means for rotating the winding roller in a direction permitting the mat to pay itself out over the floor of the container.

2. A vehicle for use in distributing loose or comminuted material over the ground, the vehicle comprising a container for the material, the container having a floor, two side walls, a fore-end wall and a rear-end wall and also having at least one rearwardly disposed outlet opening through which the material can be discharged at the rear of the vehicle, a flexible mat arranged upon the floor of the container, one end of the flexible mat being connected to a winding roller situated adjacent the rear end wall of the container, while the other end of the mat is connected to a pusher-board arranged within the container; runners resting slidably on the upper edges of the side walls of the container and acting to support the pusher-board for movement along the container; a rotatable worm arranged transversely within the container adjacent the outlet opening in the latter and adapted to cooperate with the mat and pusher-board so as to direct the material to be distributed into the said opening, the worm comprising a rotatable shaft carrying two sets of helically shaped blades progressing towards one another; means for rotating the worm from a road wheel of the vehicle when the latter travels forwardly over the ground; driving mechanism arranged between the worm shaft and the winding roller and adapted, during forward travel of the vehicle, to rotate the roller step-by-step in a direction for winding the mat thereon with consequent step-by-step movement of the pusher-board towards the worm, said mechanism comprising a crank secured to the worm shaft, a rotatable ratchet wheel, an arm mounted for a rocking movement about the axis of the ratchet wheel, a pawl carried by the arm and engaging with the ratchet wheel, and a rod one end of which is rotatably connected to the crank while the other end is rotatably connected to the arm so that the crank will act to rock the arm with consequent reciprocation of the pawl; means for varying the amplitude of reciprocatory movement of the pawl, said means comprising a block to which the first-mentioned end of said rod is rotatably connected and which is carried by the crank and is movable towards and away from the axis thereof by means of a screw; means actuated by one of the said runners for rendering the pawl inoperative when the pusher-board reaches a position near the worm; and means for rotating the winding roller in a direction permitting the mat to pay itself out over the floor of the container.

3. A vehicle for use in distributing loose or comminuted material over the ground, the vehicle comprising a container for the material, the container having a floor, two side walls, a fore-end wall and a rear-end wall and also having at least one rearwardly disposed outlet opening through which the material can be discharged at the rear of the vehicle, a flexible mat arranged upon the floor of the container, one end of the flexible mat being connected to a winding roller situated adjacent the rear end wall of the container, while the other end of the mat is connected to a pusher-board arranged within the container; runners resting slidably on the upper edges of the side walls of the container and acting to support the pusher-board for movement along the container; a rotatable worm arranged transversely within the container adjacent the outlet opening in the latter and adapted to cooperate with the mat and pusher-board so as to direct the material to be distributed into the said opening, the worm comprising a rotatable shaft carrying two sets of helically shaped blades progressing towards one another; means for rotating the worm from a road wheel of the vehicle when the latter travels forwardly over the ground; driving mechanism arranged between the worm shaft and the winding roller and adapted, during forward travel of the vehicle, to rotate the roller step-by-step in a direction for winding the mat thereon with consequent step-by-step movement of the pusher-board towards the worm, said mechanism comprising a crank secured to the worm shaft, a rotatable ratchet wheel, an arm mounted for a rocking movement about the axis of the ratchet wheel, a pawl carried by the arm and engaging with the ratchet wheel, and a rod one end of which is rotatably connected to the crank while the other end is rotatably connected to the arm so that the crank will act to rock the arm with consequent reciprocation of the pawl; means for varying the amplitude of reciprocatory movement of the pawl; means for rendering the pawl inoperative when the pusher-board reaches a position near the worm, said means comprising a shoe mounted for upward and downward movement and adapted, when in lowered position, to engage with a part of the pawl so as to move the latter out of driving engagement with the ratchet wheel, said shoe being connected to a pivoted arm carrying a pivoted finger-piece normally resting on an upper edge of the container and acting, through said arm, to hold the shoe in elevated position, and one of the said runners being adapted, when the pusher-board reaches a rearward position, to engage with and displace said finger-piece so that said pivoted arm can move downwardly with consequent descent of the shoe; and means for rotating the winding roller in a direction permitting the mat to pay itself out over the floor of the container.

References Cited in the file of this patent

UNITED STATES PATENTS

| | | |
|---|---|---|
| 401,768 | Tigner | Apr. 23, 1889 |
| 773,332 | Merrell | Oct. 25, 1904 |
| 927,095 | Behrens | July 6, 1909 |
| 1,251,372 | Hewitt | Dec. 25, 1917 |
| 2,302,879 | Neighbour et al. | Nov. 24, 1942 |
| 2,303,583 | Sallee | Dec. 1, 1942 |
| 2,303,876 | Gaddis | Dec. 1, 1942 |
| 2,368,470 | Hopkins | Jan. 30, 1945 |
| 2,442,743 | Wester | June 1, 1948 |
| 2,478,228 | Benson | Aug. 9, 1949 |
| 2,478,583 | Hybbert | Aug. 9, 1949 |
| 2,484,325 | Wachter | Oct. 11, 1949 |
| 2,523,994 | McCloy | Sept. 26, 1950 |
| 2,657,583 | Neighbour | Nov. 3, 1953 |

FOREIGN PATENTS

| | | |
|---|---|---|
| 726,059 | Germany | Oct. 5, 1942 |